US 6,697,760 B2

(12) United States Patent
Myers (10) Patent No.: US 6,697,760 B2
(45) Date of Patent: Feb. 24, 2004

(54) POSITION TRANSDUCER (75) Inventor: Elliott Myers, Herts (GB)

(73) Assignee: In2games Limited (GB)

( * ) Notice: Subject to any disclaimer, the term of this patent is extended or adjusted under 35 U.S.C. 154(b) by 115 days.

(21) Appl. No.: 09/989,608

(22) Filed: Nov. 20, 2001

(65) Prior Publication Data
US 2002/0064289 A1 May 30, 2002

(30) Foreign Application Priority Data
Nov. 28, 2000 (GB) ................................ 0028942

(51) Int. Cl.⁷ .................................... H04R 25/00
(52) U.S. Cl. ............................................... 702/150
(58) Field of Search ................ 702/150; 455/404; 701/213, 203, 209; 370/350; 381/150; 324/207; 340/995

(56) References Cited

U.S. PATENT DOCUMENTS

| 6,131,067 A | * 10/2000 | Girerd et al. ......... 701/213 |
| 6,361,436 B1 | 3/2002 | Gouji et al. |
| 6,518,749 B1 | * 2/2003 | Oudet et al. ......... 324/207.2 |

FOREIGN PATENT DOCUMENTS

| GB | 1473063 | 5/1977 |
| GB | 2234910 | 2/1991 |
| GB | 2248102 | 3/1992 |
| WO | 8800851 | 2/1988 |

OTHER PUBLICATIONS

U.S. patent application Publication (No. 2001/0021665 A1) Pub. Dated Sep. 13, 2001—Inventor, Gouji et al.

* cited by examiner

Primary Examiner—John Barlow
Assistant Examiner—Tung Lau
(74) Attorney, Agent, or Firm—Galgano & Burke

(57) ABSTRACT

A transducer for detecting position in three generally orthogonal directions has a base unit (10), a mobile unit (20) and a hollow elongate arm (6) which is fixed to the base unit and is angularly movable relative to the base unit such that in use it extends generally towards the mobile unit. A variable length coupling line (4) coupling the base unit to the mobile unit passes through the guide arm and thus measurement of the angular position of the guide arm and the extended length of the coupling length of the coupling line enables the relative positions of the base unit and the mobile unit to be calculated. The angle made between the coupling line and the mobile unit may also be measured which allows the position of distal parts of the mobile unit to be determined relative to the base unit.

20 Claims, 4 Drawing Sheets

POSITION TRANSDUCER

This invention relates to a position transducer for detecting position in three generally orthogonal directions.

In accordance with the invention there is provided a base unit, a mobile unit movable relative to the base unit, a generally tubular elongate guide arm fixed to the base unit and arranged to be angularly movable such that it in use, it extends generally towards the mobile unit, and a variable length coupling line passing through the guide arm and fixed to the mobile unit at its distal end, the transducer being operable to output information about the angular position of the guide arm and the extended length of the coupling line from which information, the relative positions of the base unit and mobile unit are calculable.

Embodiments of the invention will now be described by way of example with reference to the drawings in which.

Figure 1:
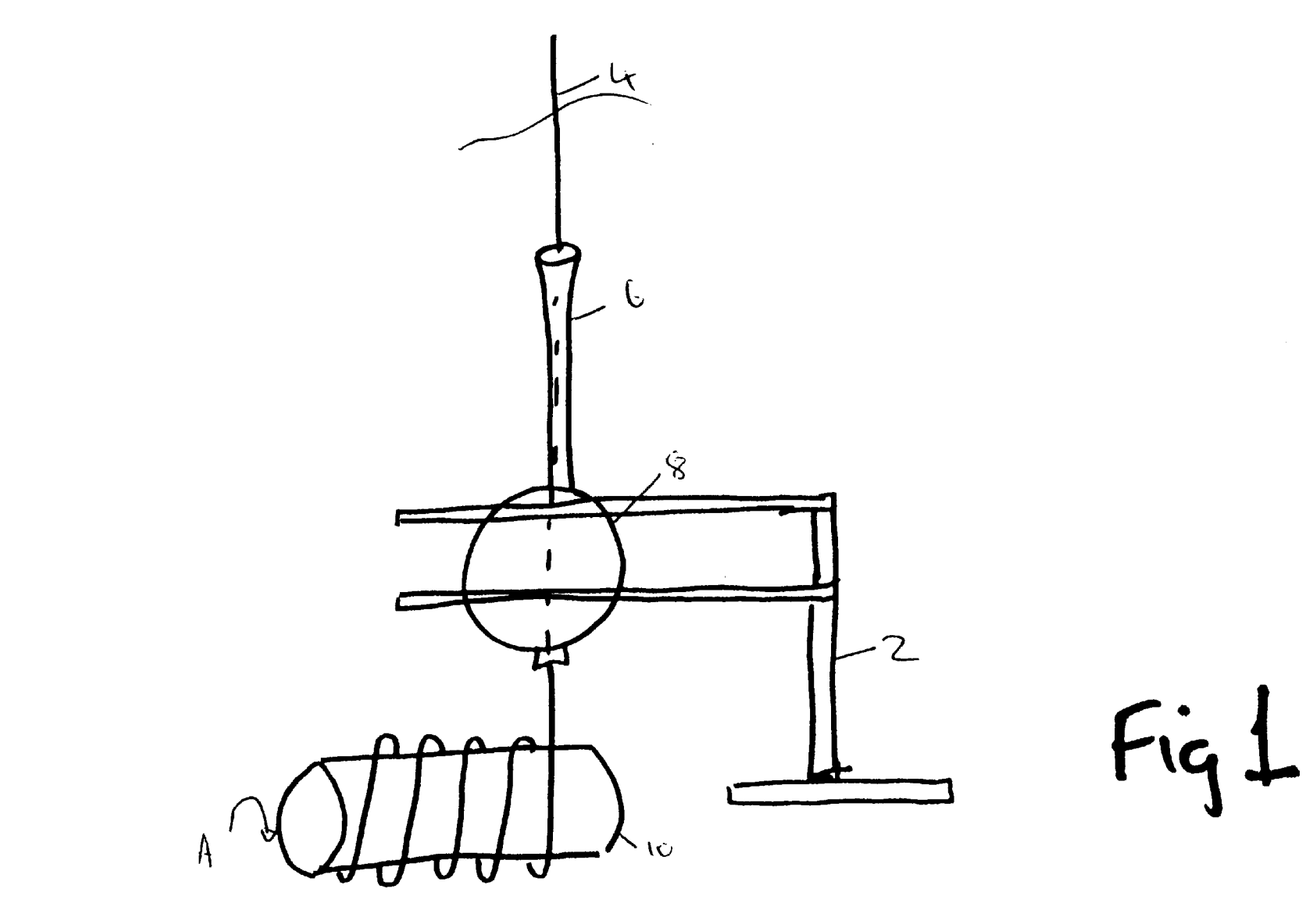
FIG. 1 is a side elevation of a transducer in accordance to the invention.

With reference to FIG. 1, the transducer has a base unit 2 and a mobile unit (not shown) fixed to the distal end of a variable length coupling line 4. The coupling line 4 passes through a generally tubular elongate guide arm 6 and through a ball 8 and is then wound onto a drum 10.

The drum 10 is spring loaded so that it is biased to rotate in the direction of arrow A. Thus, as the coupling line 4 is extended outwardly through the guide arm 6, the line is unwound from the drum 10. The unwinding motion is resisted by the spring loading and therefore if the pulling force on the line 4 is reduced, the line is rewound onto the drum 10 under the action of the spring load biasing force.

The ball 8 is mounted in bearings (not shown) so that the guide arm is articulated. This means that if the angular position of the cord relative to the base unit 2 is varied, the guide arm 6 tends to follow the direction of extension of the coupling line 4.

Figure 2:
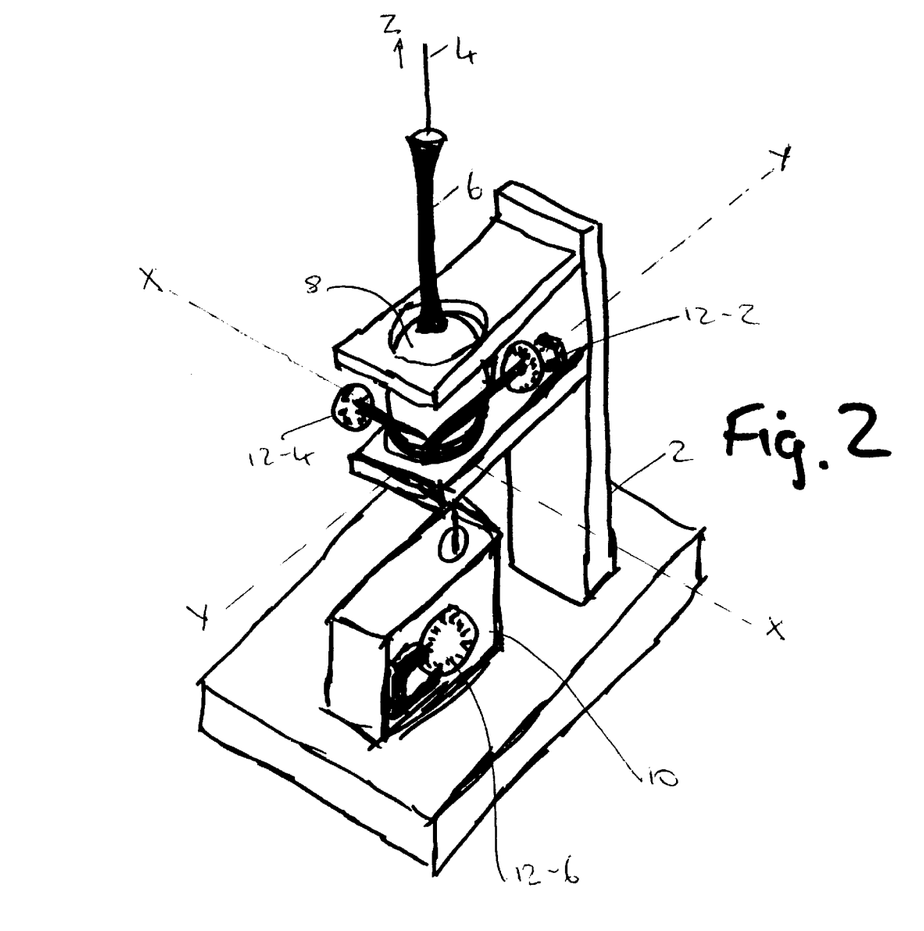
FIG. 2 is a perspective view of the transducer of FIG. 1.

With reference to FIG. 2, the angular position of the ball 8 (and therefore the direction of extension of the guide arm 6) is sensed in two axes x and y. The sensing may be performed using optical means (by putting a light source and a light detector on opposite sides of a slotted wheel 12-2 and 12-4 as shown) or using other means such as rotary potentiometers. It will be appreciated that techniques presently used in sensing the movement of a ball in a computer mouse or sensing movement in a computer joystick may be applied to the problem of measuring the angular position of the ball 8.

The angular position of the drum 10 may also be sensed using similar techniques by, for example, putting a slotted disc 12-6 at one end of the axle of the drum 10. In this way, the extended length or change in the length, of the coupling line 4 may be monitored or measured. Thus, the position of the mobile unit at the distal end of the coupling line 4 may be determined along the axis passing generally through the center of the guide arm (marked z in the drawings) using the measurement at the axle of the drum 10. Furthermore, the angular direction of extension of the guide arm and of the coupling line 4 may be determined using the sensors 12-2 and 12-4. Thus the position of the mobile unit relative to the base unit 2 may be uniquely be determined along the x y and z axes.

Thus, for example, by placing the base unit on the floor or on a table and attaching the mobile unit to an operator's hand (for example by forming the mobile unit as a glove which may be put on the operator's hand), movements of the operator's hand may be tracked by monitoring the positions of the sensors 12-2, 12-4 and 12-6.

This has applications as a input device for a computer game, for example. It also has broader applications in any situation where it is required to monitor the position of an article at the end of a line (for example, a tethered animal or pet).

Figure 3:
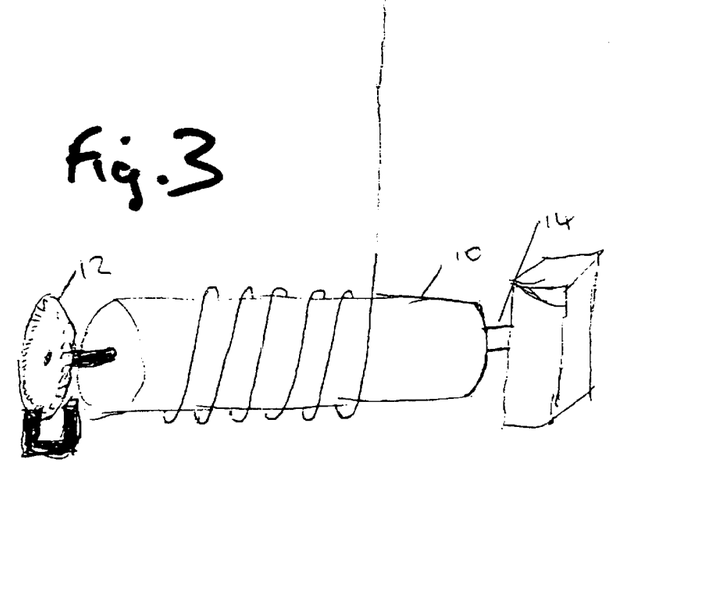
FIG. 3 is a partial side elevation of an alternative embodiment of a transducer in accordance with the invention incorporating force feedback.

With reference to FIG. 3, it may be desirable to allow the base unit 2 to impart movement to the mobile unit for example, to provide a so-called "force feedback" sensation. This may be achieved, for example by driving the drum 10 so that the mobile unit is pulled and released in accordance with the driving motion applied to the drum axle 14.

Figure 4:
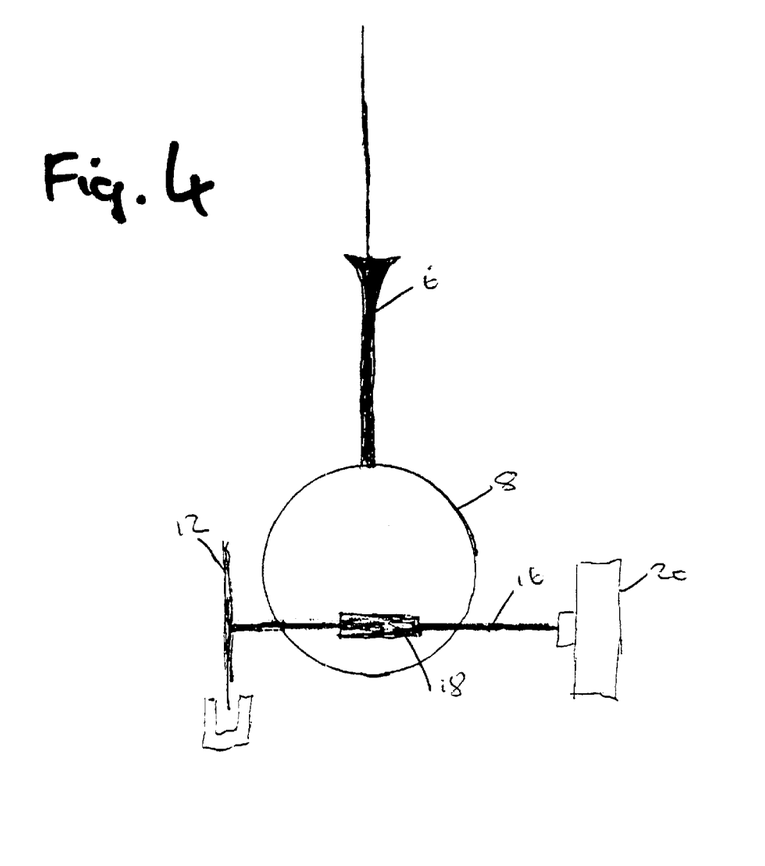
FIG. 4 is a partial side elevation of a further alternative embodiment incorporating force feedback.

Additionally or alternatively, the ball 8 may be driven in one or both axes as shown in FIG. 4. In this embodiment, position sensing of the ball 8 is achieved using a rotatable rod 16 which is rotated by frictional contact with the ball 8 via a resilient sleeve 18. An actuator 20 at one end of the rod 16 may also rotate the rod 16 and thereby impart motion to the ball 8. Also, this motion is directly read by the position sensor 12-2 or 12-4 which therefore allows apparatus attempting to interpret the outputs of the position sensors 12 to recognise movement resulting from the actuator 20 as opposed to movement resulting from the mobile unit being moved.

It will be appreciated that the ball-and-socket arrangement may be replaced with more conventional joystick-type arrangements. Similarly, the force-feedback arrangements disclosed in connection with FIG. 4 may also be selected from the known arrangements.

Figure 5:
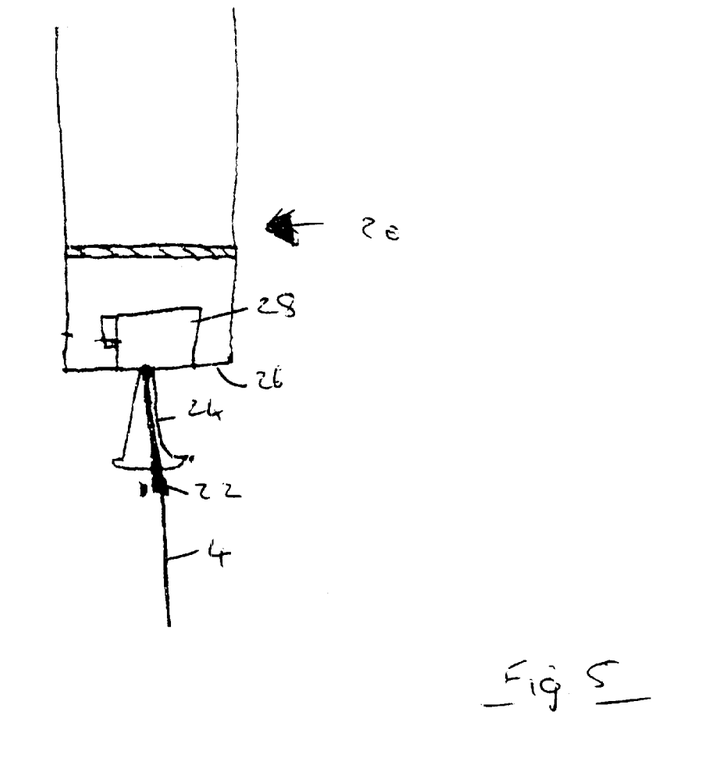
FIG. 5 is a schematic side elevation of a mobile unit in accordance with the invention.

With reference to FIG. 5, a mobile unit 20 is attached to the distal end of the coupling line 4. The lower end of the mobile unit 20 preferably has a plastic or other low friction material, sheath around the coupling line 4 to reduce wear on the coupling line. The sheath is marked with the reference numeral 22. Preferably also, the coupling line 4 passes through a funnel-shaped cable guide 24 which ensures that the angle between the coupling line 4 and the base 26 of the mobile unit 20 does not become too acute and which also allows a "joystick assembly" 28 to monitor or measure the angle between the coupling line 4 and the mobile unit 20 in a similar manner to the guide arm 6 on the base unit 2.

Thus the "joystick assembly" 28 operates to measure the angle between the coupling line 4 and the mobile unit 20. This information may be passed back down the coupling line 4 (which may incorporate electrical conductors for this purpose) so that angular movements (for example rotational movements) of the mobile unit 20 which do not result in corresponding movement between the coupling line 4 and the base unit 2, may be monitored or measured. Thus for example in the context of a games transducer, the mobile unit may for example be in the form of a sword. The coupling line may enter the sword in the region of the handle of the sword and the joystick assembly may be used to detect rotation of the sword both about its longitudinal axis and along its longitudinal axis. This, for example, allows the position of the point of the sword to be determined relative to the base unit 2. A similar technique may be applied for use for example with a racket sports implement such as a tennis racket. Also, the force feedback arrangements described in connection with the earlier figures, may be used in conjunction with this embodiment to simulate contact with a ball, for example.

In this way, the "force feedback" sensation may be used for example to simulate the weight of an object (by pulling generally downwardly via the coupling line 4) or the pulling sensation of wind for example on a kite simulation. Furthermore, the mobile unit may include transducers such as motors driving weights on eccentric shafts or similar force feedback mechanisms, to simulate movement in other planes. For example, in a boxing simulation, the transducer may be driven in a boxing glove (which forms the mobile unit) to simulate the impact of the glove on an object or a so-called "rumble transducer" may be used to simulate vibration transmitted through an object. The mobile unit may also include buttons or the like in the manner of a conventional joystick. The signals for these buttons may be carried through conductors associated with a coupling line 4 as described above, may be operated using wireless communications (for example RF or infrared) or may be carried on a separate electrical cable which is separate from the coupling line and which preferably falls freely forming a loose path between the mobile unit and the base unit. This cable may also be used to control and power "force feedback" transducers in the mobile unit.

Figure 6:
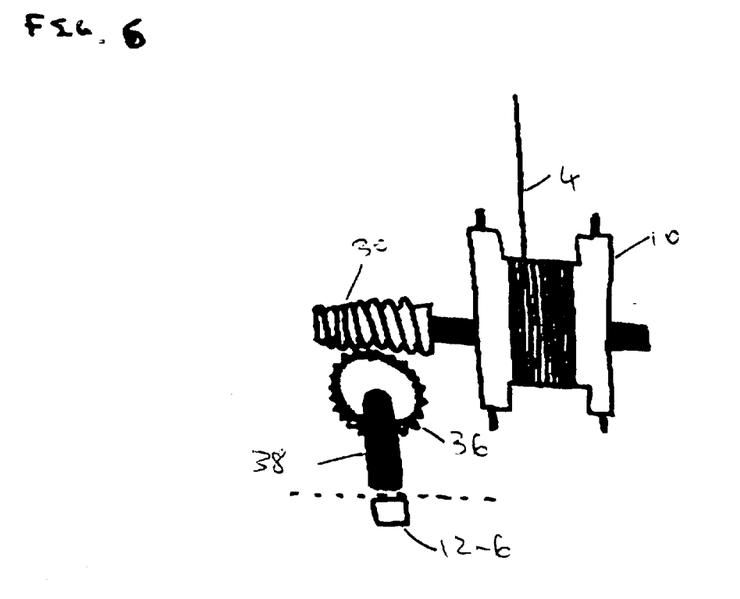
FIG. 6 is a schematic side elevation of a gearing arrangement in accordance with the invention.

In a preferred embodiment, the base unit includes a gearing mechanism as shown in FIG. 6. This provides a reduction gear between the drum 10 and the sensor 12-6. This may be achieved for example using a worm gear 30 which is rotated by the drum 10, in conjunction with a gear wheel 32. The shaft (38) of the gear wheel may be mechanically coupled to the sensor 12-6. This gearing arrangement then reduces the speed of rotation of the sensor 12-6 which may be useful in optical sensor arrangements and also reduces the angular movement of the sensor 12-6 which may allow a rotary potentiometer to be used for sensing the extended length of the coupling line 4. Furthermore, the mechanism may incorporate a clutch (not shown) to prevent excessive acceleration of the components within the base unit following rapid movement of the mobile unit. This may be used to protect the mechanical components of the base unit from damage.

What is claimed is:

1. A position transducer for detecting position in three generally orthogonal directions comprising:
   (a) a base unit,
   (b) a mobile unit movable relative to the base unit,
   (c) a hollow guide arm fixed to the base unit and arranged to be angularly movable such that, in use, it extends generally towards the mobile unit,
   (d) a variable length coupling line passing through the guide arm and fixed to the mobile unit at its distal end, and
   (e) drive means operable to alter at least one of the length of the coupling line and the angular position of the guide arm, thereby to impart movement to the mobile unit, the transducer being operable to output information about the angular position of the guide arm and the extended length of the coupling line from which information, the relative positions of the base unit and mobile unit are calculable.

2. A transducer according to claim 1, including integral processing means operable to calculate the relative positions of the base unit and mobile unit based on the angular position of the guide arm and the extended length of the coupling line, the transducer being operable thereby to output the said relative positions directly as x, y, z co-ordinate values.

3. A transducer according to claim 1, wherein the coupling line is flexible and wherein the base unit is arranged to provide a predetermined pulling load on the line so that the line is kept under tension as the mobile unit is moved relative to the base unit.

4. A transducer according to claim 1, wherein the guide arm is held in a fixed relationship to the ball of a ball-and-socket arrangement and wherein the base unit is arranged to detect rotation of the ball about two generally co-planar, generally orthogonal detection axes, the guide arm being arranged to extend in a direction generally normal to the plane of the detection axes.

5. A transducer according to claim 1, wherein the mobile unit includes an angle sensor for sensing the angle of the coupling line relative to the mobile unit.

6. A transducer according to claim 1, additionally including a computer program which, when executed by a computer, causes the computer to interpret the output signals of the position transducer and to provide a visual display representation of at least one of the motion and position of the mobile unit.

7. A computer program according to claim 6, wherein the program is carried on computer readable media.

8. A transducer according to claim 7, additionally including a computer program which, when executed by a computer, causes the computer to interpret the output signals of the position transducer and to provide a visual display representation of at least one of the motion and position of the mobile unit.

9. A transducer according to claim 8, wherein the program is carried on computer readable media.

10. A transducer according to claim 8, wherein the program is transmissible over a network.

11. A transducer according to claim 10, wherein the network is the Internet.

12. A transducer according to claim 6, wherein the program is transmissible over a network.

13. A transducer according to claim 12, wherein the network is the Internet.

14. A transducer according to claim 1, wherein said movement to the mobile unit are simulated vibrational movements.

15. A position transducer for detecting position in three generally orthogonal directions comprising:
   (a) a base unit,
   (b) a mobile unit movable relative to the base unit,
   (c) a hollow guide arm fixed to the base unit and arranged to be angularly movable such that in, use, it extends generally towards the mobile unit, and
   (d) a variable length coupling line passing through the guide arm and fixed to the mobile unit at its distal end, the coupling line being flexible and wherein the base unit is arranged to provide a predetermined pulling load on the line so that the line is kept under tension as the mobile unit is moved relative to the base unit and the transducer being operable to output information about the angular position of the guide arm and the extended length of the coupling line from which information regarding the relative positions of the base unit and mobile unit are calculable.

16. A transducer according to claim 15, including integral processing means operable to calculate the relative positions of the base unit and mobile unit based on the angular position of the guide arm and the extended length of the coupling line, the transducer being operable thereby to output the said relative positions directly as x, y, z co-ordinate values.

17. A transducer according to claim 15, further including drive means operable to alter at least one of the length of the coupling line and the angular position of the guide arm, thereby to impart movement to the mobile unit.

18. A transducer according to claim 17, wherein said movement are simulated vibrational movement.

19. A transducer according to claim 15, wherein the guide arm is held in a fixed relationship to the ball of a ball-and-socket arrangement and wherein the base unit is arranged to detect rotation of the ball about two generally co-planar, generally orthogonal detection axes, the guide arm being arranged to extend in a direction generally normal to the plane of the detection axes.

20. A transducer according to claim 15 wherein the mobile unit includes an angle sensor for sensing the angle of the coupling line relative to the mobile unit.

* * * * *

UNITED STATES PATENT AND TRADEMARK OFFICE
CERTIFICATE OF CORRECTION

PATENT NO. : 6,697,760 B2
DATED : February 24, 2004
INVENTOR(S) : Elliott Myers

It is certified that error appears in the above-identified patent and that said Letters Patent is hereby corrected as shown below:

Drawings,
Please substitute the 4 sheets of Formal drawings containing FIGS. 1-6 enclosed herewith for the informal drawings of record.

Signed and Sealed this

Twenty-fourth Day of August, 2004

JON W. DUDAS
*Director of the United States Patent and Trademark Office*

(12) United States Patent  (10) Patent No.: US 6,697,760 B2
Myers  (45) Date of Patent: Feb. 24, 2004

(54) POSITION TRANSDUCER (75) Inventor: Elliott Myers, Herts (GB)

(73) Assignee: In2games Limited (GB)

( * ) Notice: Subject to any disclaimer, the term of this patent is extended or adjusted under 35 U.S.C. 154(b) by 115 days.

(21) Appl. No.: 09/989,608

(22) Filed: Nov. 20, 2001

(65) Prior Publication Data

US 2002/0064289 A1 May 30, 2002

(30) Foreign Application Priority Data

Nov. 28, 2000 (GB) .............................. 0028942

(51) Int. Cl.$^7$ ............................................. H04R 25/00
(52) U.S. Cl. ...................................................... 702/150
(58) Field of Search ........................ 702/150; 455/404; 701/213, 203, 209; 370/350; 381/150; 324/207; 340/995

(56) References Cited

U.S. PATENT DOCUMENTS 6,131,067 A  * 10/2000  Girerd et al. ............... 701/213
6,361,436 B1     3/2002  Gouji et al.
6,518,749 B1  *  2/2003  Oudet et al. ............. 324/207.2

FOREIGN PATENT DOCUMENTS

| GB | 1473063 | 5/1977 |
| GB | 2234910 | 2/1991 |
| GB | 2248102 | 3/1992 |
| WO | 8800851 | 2/1988 |

OTHER PUBLICATIONS

U.S. patent application Publication (No. 2001/0021665 A1) Pub. Dated Sep. 13, 2001—Inventor, Gouji et al.

* cited by examiner

Primary Examiner—John Barlow
Assistant Examiner—Tung Lau
(74) Attorney, Agent, or Firm—Galgano & Burke (57) ABSTRACT

A transducer for detecting position in three generally orthogonal directions has a base unit (10), a mobile unit (20) and a hollow elongate arm (6) which is fixed to the base unit and is angularly movable relative to the base unit such that in use it extends generally towards the mobile unit. A variable length coupling line (4) coupling the base unit to the mobile unit passes through the guide arm and thus measurement of the angular position of the guide arm and the extended length of the coupling length of the coupling line enables the relative positions of the base unit and the mobile unit to be calculated. The angle made between the coupling line and the mobile unit may also be measured which allows the position of distal parts of the mobile unit to be determined relative to the base unit.

20 Claims, 4 Drawing Sheets